(12) United States Patent  (10) Patent No.: US 7,940,249 B2
Perreault  (45) Date of Patent: May 10, 2011

(54) DEVICES USING A METAL LAYER WITH AN ARRAY OF VIAS TO REDUCE DEGRADATION

(75) Inventor: George Perreault, Campbell, CA (US)

(73) Assignee: Authentec, Inc., Melbourne, FL (US)

( * ) Notice: Subject to any disclaimer, the term of this patent is extended or adjusted under 35 U.S.C. 154(b) by 1224 days.

(21) Appl. No.: 11/591,242

(22) Filed: Oct. 31, 2006

(65) Prior Publication Data

US 2007/0098228 A1    May 3, 2007

Related U.S. Application Data

(60) Provisional application No. 60/732,595, filed on Nov. 1, 2005.

(51) Int. Cl.
  *G06F 3/041* (2006.01)
  *G06F 3/044* (2006.01)
(52) U.S. Cl. ............ 345/173; 178/18.06; 382/124
(58) Field of Classification Search .......... 345/173–178; 178/18.01–18.11; 200/600; 148/33.2; 324/686–688; 382/124, 312, 316
  See application file for complete search history.

(56) References Cited

U.S. PATENT DOCUMENTS

| 5,283,735 | A | 2/1994 | Gross et al. | 364/413.02 |
|---|---|---|---|---|
| 5,327,161 | A | 7/1994 | Logan et al. | 345/157 |
| 5,610,993 | A | 3/1997 | Yamamoto | 382/124 |
| 5,612,719 | A | 3/1997 | Beernink et al. | 345/173 |
| 5,666,113 | A | 9/1997 | Logan | 341/34 |
| 5,689,285 | A | 11/1997 | Asher | 345/161 |
| 5,740,276 | A | 4/1998 | Tomko et al. | 382/210 |
| 5,821,930 | A | 10/1998 | Hansen | 345/340 |
| 5,825,352 | A | 10/1998 | Bisset et al. | 345/173 |
| 5,825,907 | A | 10/1998 | Russo | 382/124 |
| 5,862,248 | A | 1/1999 | Salatino et al. | 382/124 |
| 5,880,411 | A | 3/1999 | Gillespie et al. | 178/18.01 |
| 5,907,327 | A | 5/1999 | Ogura et al. | 345/339 |

(Continued)

FOREIGN PATENT DOCUMENTS

JP    2000-056877 A    2/2000

OTHER PUBLICATIONS

Xudong Jiang et al., "Fingerprint Minutiae Matching Based on the Local and Global Structures," Sep. 2000, pp. 1038-1041, IEEE.

(Continued)

*Primary Examiner* — Bipin Shalwala
*Assistant Examiner* — Steven E Holton
(74) *Attorney, Agent, or Firm* — Allen, Dyer, Doppelt, Milbrath & Gilchrist, P.A.

(57) ABSTRACT

A device in accordance with the present invention has a top metal layer that shows increased resistance to degradation such as abrasion, erosion, or both. A device in accordance with the present invention includes a device layer and a top metal layer. The device layer includes contact sensing elements and has a plurality of depressions that extend into the device layer. The first metal layer overlies or is adjacent to the contact sensing elements and extends into the depressions. Preferably, a surface of the metal layer opposed to the device layer is contoured to the depressions. In some embodiments the top metal layer makes electrical connections to the contact sensor, but in other embodiments it does not. Preferably, the device forms a finger swipe sensor, and the contact sensing elements are coupled to finger swipe processing electronics.

39 Claims, 9 Drawing Sheets

U.S. PATENT DOCUMENTS

| | | | |
|---|---|---|---|
| 5,909,211 A | 6/1999 | Combs et al. | 345/172 |
| 5,940,526 A | 8/1999 | Setlak et al. | 382/124 |
| 5,963,679 A | 10/1999 | Setlak | 382/312 |
| 5,995,084 A | 11/1999 | Chan et al. | 345/173 |
| 5,995,623 A | 11/1999 | Kawano et al. | 380/21 |
| 5,995,630 A | 11/1999 | Borza | 380/54 |
| 6,011,849 A | 1/2000 | Orrin | 380/42 |
| 6,035,398 A | 3/2000 | Bjorn | 713/186 |
| 6,057,830 A | 5/2000 | Chan et al. | 345/157 |
| 6,061,051 A | 5/2000 | Chan et al. | 345/173 |
| 6,135,958 A | 10/2000 | Mikula-Curtis et al. | 600/443 |
| 6,141,753 A | 10/2000 | Zhao et al. | 713/176 |
| 6,208,329 B1 | 3/2001 | Ballare | 345/173 |
| 6,219,793 B1 | 4/2001 | Li et al. | 713/202 |
| 6,219,794 B1 | 4/2001 | Soutar et al. | 713/202 |
| 6,248,655 B1 | 6/2001 | Machida et al. | 438/597 |
| 6,259,804 B1 | 7/2001 | Setlak et al. | 382/124 |
| 6,278,443 B1 | 8/2001 | Amro et al. | 345/173 |
| 6,317,508 B1 | 11/2001 | Kramer et al. | 382/124 |
| 6,330,345 B1 | 12/2001 | Russo et al. | 382/115 |
| 6,408,087 B1 | 6/2002 | Kramer | 382/124 |
| 6,501,142 B2 * | 12/2002 | Thomas et al. | 257/414 |
| 6,518,560 B1 | 2/2003 | Yeh et al. | 250/214 |
| 6,535,622 B1 | 3/2003 | Russo et al. | 382/124 |
| 6,546,122 B1 | 4/2003 | Russo | 382/125 |
| 6,563,101 B1 | 5/2003 | Tullis | 250/208.1 |
| 6,601,169 B2 | 7/2003 | Wallace, Jr. et al. | 713/151 |
| 6,661,631 B1 | 12/2003 | Meador et al. | 361/93.1 |
| 6,667,439 B2 | 12/2003 | Salatino et al. | 174/52.1 |
| 6,668,072 B1 | 12/2003 | Hribernig et al. | 382/124 |
| 6,681,034 B1 | 1/2004 | Russo | 382/124 |
| 6,754,365 B1 | 6/2004 | Wen et al. | 382/100 |
| 6,804,378 B2 | 10/2004 | Rhoads | 382/100 |
| 6,876,756 B1 | 4/2005 | Vieweg | 382/124 |
| 6,961,452 B2 | 11/2005 | Fujii | 382/125 |
| 7,002,553 B2 | 2/2006 | Shkolnikov | 345/169 |
| 7,003,670 B2 | 2/2006 | Heaven et al. | 713/186 |
| 7,020,270 B1 | 3/2006 | Ghassabian | 379/368 |
| 7,054,470 B2 | 5/2006 | Bolle et al. | 382/124 |
| 7,113,179 B2 | 9/2006 | Baker et al. | 345/173 |
| 7,136,514 B1 | 11/2006 | Wong | 382/124 |
| 7,197,168 B2 | 3/2007 | Russo | 382/125 |
| 7,263,212 B2 | 8/2007 | Kawabe | 382/124 |
| 7,280,679 B2 | 10/2007 | Russo | 382/124 |
| 7,299,360 B2 | 11/2007 | Russo | 713/182 |
| 7,339,572 B2 | 3/2008 | Schena | 345/156 |
| 7,369,688 B2 | 5/2008 | Ser et al. | 382/124 |
| 2002/0130673 A1 | 9/2002 | Pelrine et al. | 324/727 |
| 2002/0186203 A1 | 12/2002 | Huang | 345/157 |
| 2002/0188854 A1 | 12/2002 | Heaven et al. | 713/186 |
| 2003/0028811 A1 | 2/2003 | Walker et al. | 713/202 |
| 2003/0115490 A1 | 6/2003 | Russo et al. | 713/202 |
| 2003/0123714 A1 | 7/2003 | O'Gorman et al. | 382/124 |
| 2003/0126448 A1 | 7/2003 | Russo | 713/186 |
| 2003/0135764 A1 | 7/2003 | Lu | 713/202 |
| 2003/0214481 A1 | 11/2003 | Xiong | 345/157 |
| 2004/0014457 A1 | 1/2004 | Stevens | 455/414.1 |
| 2004/0128521 A1 | 7/2004 | Russo | 713/186 |
| 2004/0148526 A1 | 7/2004 | Sands et al. | 713/202 |
| 2004/0156538 A1 | 8/2004 | Greschitz et al. | 382/124 |
| 2004/0186882 A1 | 9/2004 | Ting | 709/202 |
| 2004/0020834 A1 | 10/2004 | Baharav et al. | 382/124 |
| 2004/0208348 A1 | 10/2004 | Baharav et al. | 382/124 |
| 2004/0252867 A1 | 12/2004 | Lan et al. | 382/124 |
| 2004/0258282 A1 | 12/2004 | Bjorn et al. | 382/124 |
| 2004/0263479 A1 | 12/2004 | Shkolnikov | 345/169 |
| 2005/0012714 A1 | 1/2005 | Russo et al. | 345/157 |
| 2005/0041885 A1 | 2/2005 | Russo | 382/289 |
| 2005/0144329 A1 | 6/2005 | Tsai et al. | 710/1 |
| 2005/0169503 A1 | 8/2005 | Howell et al. | 382/115 |
| 2005/0179657 A1 | 8/2005 | Russo et al. | 345/163 |
| 2005/0259851 A1 | 11/2005 | Fyke | 382/124 |
| 2005/0259852 A1 | 11/2005 | Russo | 382/124 |
| 2006/0034043 A1 | 2/2006 | Hisano et al. | 361/681 |
| 2006/0078174 A1 | 4/2006 | Russo | 382/121 |
| 2006/0103633 A1 | 5/2006 | Gioeli | 345/173 |
| 2006/0242268 A1 | 10/2006 | Omernick et al. | 709/219 |
| 2006/0280346 A1 | 12/2006 | Machida | 382/124 |
| 2007/0014443 A1 | 1/2007 | Russo | 382/124 |
| 2007/0016779 A1 | 1/2007 | Lyle | 713/169 |
| 2007/0034783 A1 | 2/2007 | Eliasson et al. | 250/221 |
| 2007/0038867 A1 | 2/2007 | Verbauwhede et al. | 713/186 |
| 2007/0061126 A1 | 3/2007 | Russo et al. | 703/24 |
| 2007/0067642 A1 | 3/2007 | Singhal | 713/186 |
| 2007/0125937 A1 | 6/2007 | Eliasson et al. | 250/221 |
| 2007/0146349 A1 | 6/2007 | Errico et al. | 345/174 |
| 2007/0274575 A1 | 11/2007 | Russo | 382/124 |
| 2008/0013808 A1 | 1/2008 | Russo et al. | 382/125 |

OTHER PUBLICATIONS

Kyung Deok Yu et al., "A Fingerprint Matching Algorithm based on Radial Structure and a Structure-Rewarding Scoring Strategy," Jun. 2005, pp. 656-664, AVBPA, LNCS, Audio- and Video-Based Biometric Person Authentication, Springer-Verlag Berlin Heidelberg.

Choonwoo Ryu et al. "Super-template Generation Using Successive Bayesian Estimation for Fingerprint Enrollment", Jan. 2005 Springer-Verlag Berlin Heidelberg, pp. 710-719.

Dongjae Lee et al. "Fingerprint Fusion Based on Minutiae and Ridge for Enrollment", Jan. 2003 Springer-Verlag Berlin Heidelberg, pp. 478-485.

Koichi Sasakawa et al. "Personal Verification System with High Tolerance of Poor Quality Fingerprints", May 1990 Machine Vision Systems Integration in Industry, pp. 265272.

Michal Irani et al. "Improving Resolution by Image Registration", May 1991 by Academic Press, Inc., pp. 231-239.

Qinfen Zheng et al. "A Computational Vision Approach to Image Registration", Aug. 1992 IEEE, pp. 193-197.

Wei-Yun Yau et al. "Fingerprint Templates Combination", Jan. 2004 Springer-Verlag Berlin Heidelberg, pp. 449-460.

Xudong Jiand et al. "Detecting the Fingerprint Minutiae by Adaptive Tracing the Gray-Level Ridge", May 2001, pp. 999-1013, Published by Elsevier Science Ltd.

Xudong Jiang et al. "Fingerprint Minutiae Matching Based on the Local and Global Structures", Sep. 2000 Ieee, pp. 1038-1041.

Jacob O. Wobbrock, Brad A. Myers, Htet Htet Aung, and Edmond F. LoPresti, Text Entry from Power Wheelchairs:. EdgeWrite for Joysticks and Touchpads, pp. 110-117, Human-Computer Interaction Institute School of Computer Science Carnegie Mellon University, Pittsburg, PA 15213 USA.

"Introduction to Dislocations", by D. Hull and D.J. Bacon, $4^{th}$ edition, Copyright 2001, Published by Elsevier Ltd.

* cited by examiner

FIG. 16 under 35 U.S.C. §119(a) of

DEVICES USING A METAL LAYER WITH AN ARRAY OF VIAS TO REDUCE DEGRADATION

CROSS REFERENCE TO RELATED APPLICATION

This application claims priority under 35 U.S.C. §119(a) of the U.S. provisional application Ser. No. 60/732,595, filed Nov. 1, 2005, and titled "IMPROVED RESISTANCE TO EXTERNALLY APPLIED FORCES THROUGH THE USE OF AN ARRAY OF VIAS," which is hereby incorporated by reference.

FIELD OF THE INVENTION

The present invention relates to contact sensors. More particularly, the present invention relates to finger swipe sensors.

BACKGROUND OF THE INVENTION

Electronic fingerprint sensors are used on consumer products to perform many different tasks. They are used to authenticate and verify users; to emulate other input devices such as computer mice, joy sticks, scroll bars, and pressure-sensitive push buttons; and to launch software programs, each correlated to a specific fingerprint. A fingerprint sensor on a product can be used many times during a day, to perform any one or more of these tasks. Thus, the contact surface of a fingerprint sensor is exposed to constant wear. This is especially true for finger swipe sensors, which are subjected to constant tapping and swiping.

Figure 1:
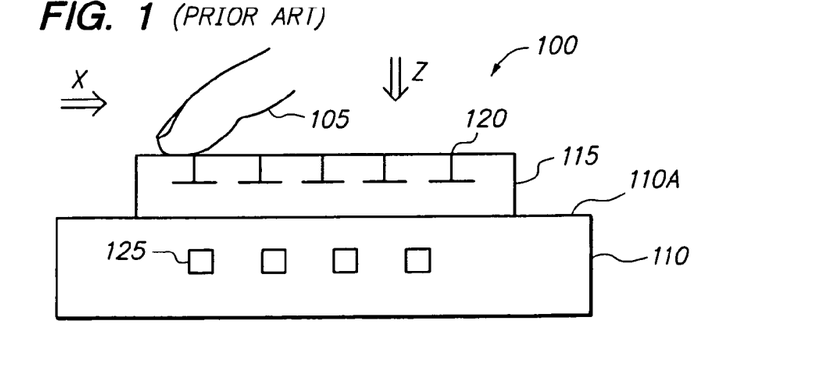
FIG. 1 is a side cross-sectional view of a finger swipe sensor in the prior art.

Some finger swipe sensors employ a top metal layer. This top metal layer can perform many functions such as providing electrostatic discharge (ESD) protection or acting as an RF antennae, to name a few uses. FIG. 1 is a side cross-sectional view of a finger swipe sensor 100 in the prior art, which employs a top metal layer. The finger swipe sensor 100 has a layer 110 containing one or more contact sensing elements 125. The layer 110 has a top surface 110A positioned under a metal layer 115. Typically, a finger 105 is swiped across a top surface of the metal layer 115, applying forces to the metal layer 115. Such externally applied forces induce plastic deformation in the metal layer 115, as illustrated by the lines of dislocations 120. Plastic deformation occurs through the creation and movement of many different types of crystallographic defects. For simplicity of the discussion and because most crystallographic defects can be modeled by dislocations, dislocation creation and movement are used as the primary mechanism through which plastic deformation occurs.

Figure 2:
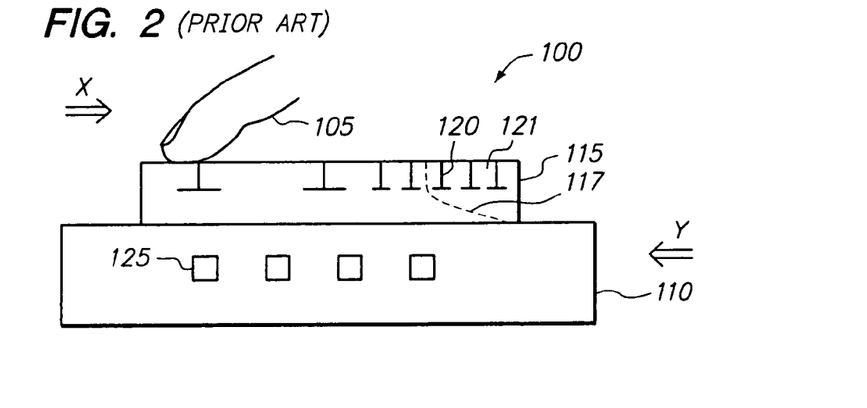
FIG. 2 is a side cross-sectional view of the finger swipe sensor of FIG. 1, showing abrasion and eroding effects.

FIG. 2 is a side cross-sectional view of the finger swipe sensor 100, after repeated swiping across a surface of the metal layer 115. As illustrated in FIG. 2, dislocations 120 that can move collect at the right end of the metal layer 115 thus plastically (irreversibly) deforming the metal layer 115. Dislocations produced by finger swiping can move through the metal layer 115 but are stopped by the metal edges, where they collect and coalesce. Dislocation coalescence produces voids along the metal edges. The metal edges become brittle from the collected dislocations and more prone to fracture along the line 117. The fractured metal is very likely permanently removed from the sensor 100, thus contributing to the observed abrasion and erosion effect of repeated finger swiping. Furthermore, any erosion on the metal layer 115 will continue, so that the rightmost edge of the metal layer 115 will creep in the direction shown by the arrow labeled Y.

SUMMARY OF THE INVENTION

Embodiments of the present invention include a contact sensor having a top metal layer used, for example, for ESD protection, as an RF antennae, or as a protective layer, to name only a few uses. The top metal layer is configured to impede the movement of dislocations and other crystal defects that would otherwise collect at the ends of the metal layer. Accordingly, the metal layer, and thus the contact sensor itself, is more resistant to degradation by, for example, abrasion effects, erosion effects, or both.

In a first aspect of the present invention, a device includes a device layer and a top metal layer. The device layer includes contact sensing elements and has a plurality of depressions that extend into the device layer. The top metal layer overlies the contact sensing surface, either completely or partially, and extends into the depressions. A top surface of the metal layer that is opposed to the device layer is contoured to the depressions. In one embodiment, the device layer also includes a second metal layer electrically coupled to the first metal layer.

In one embodiment, the plurality of depressions comprise vias arranged in a plurality of rows. Preferably, vias in adjacent rows are offset from one another. Alternatively, vias in adjacent rows are aligned with one another.

In another embodiment, the plurality of depressions include troughs. The troughs have elongated widths that extend in a direction perpendicular to a swipe direction of the device.

In one embodiment, the device layer also includes a passivation layer defining the depressions. The first metal layer is directly coupled to the passivation layer.

Preferably, the contact sensing elements include finger swipe sensing elements. Alternatively, the contact sensing elements include finger placement sensing elements, analog pressure-sensing elements, or other types of sensing elements. Preferably, the top metal layer is exposed.

In a second aspect of the present invention, a contact sensor includes a device layer containing contact sensing elements and a metal layer disposed above the device layer. In one embodiment, the metal layer is not disposed above the contact sensing elements, but in other embodiments, it is. The metal layer is not deposited in a single plane, but on multiple substantially acute planes that extend to and from the device layer. The contact sensing elements are capacitive sensing elements, optical sensing elements, electromagnetic sensing elements, thermal sensing elements, or any other kind of sensing elements. The device layer includes circuitry created on a semiconductor substrate. Preferably, the device layer includes a plurality of vias and the metal layer extends into the plurality of vias. In one embodiment, each of the plurality of vias has an aspect ratio of at least 10:1.

In a third aspect of the present invention, a device includes a contact sensing layer and an exposed metal layer overlying the contact sensing layer. The contact sensing layer includes multiple contact sensing elements and multiple patterned features that extend into the contact sensing layer. The exposed metal layer extends into the multiple patterned features and has an exposed surface contoured to walls of the multiple patterned features. The multiple patterned features divide the metal layer into multiple segments in a swipe direction of the device. In one embodiment, the multiple patterned features include rows of vias. Preferably, vias in adjacent rows are offset from one another. Alternatively, vias in adjacent rows are aligned with one another. In one embodiment, the multiple patterned features include troughs.

In one embodiment, the device also includes a host module coupled to the device layer. The host module is a personal digital assistant, a cell phone, or a digital camera, to name only a few host modules.

In a fourth embodiment of the present invention, a method of fabricating a contact sensor includes forming a contact sensing layer having a surface, one or more contact sensing elements, and patterned features that extend into the contact sensing layer; and forming a metal layer over the contact sensing elements. The metal layer can be continuous or discontinuous. The metal layer extends into the patterned features and has an exposed surface contoured to the patterned features. In one embodiment, the contact sensing layer is formed by forming a passivation layer over the one or more contact sensing elements. The passivation layer is patterned with the patterned features.

Preferably, the method also includes coupling the one or more contact sensing elements to finger swipe processing electronics. Alternatively, the method also includes coupling the one or more contact sensing elements to finger placement processing electronics or coupling the one or more contact sensing elements to pressure sensitive processing electronics.

Preferably, the patterned features include a plurality of vias, which form an ordered array. Alternatively, the patterned features include a plurality of troughs or a combination of vias and troughs. In one embodiment, each of the plurality of troughs has an elongated width that extends in a direction perpendicular to a swipe direction of the contact sensor.

DETAILED DESCRIPTION

A metal layer of a contact sensor, such as a finger swipe sensor, is susceptible to degradation and damage caused by externally applied forces to the metal layer of the sensor. These forces can be applied by, for example, a finger swiping against a top surface of the metal layer. Finger swiping and other externally applied forces produce abrasion effects, erosion effects, or both, which deform and ultimately remove the metal layer. Structures in accordance with the present invention protect against such deformation by including patterned features within the metal layer.

In accordance with one embodiment of the invention, the patterned features include vias. Because dislocations cannot glide over vias as easily as they can glide through a planar metal layer, dislocation movement and creation are hindered, significantly reducing the abrasion effect, erosion effect, or both. Accordingly, the vias through the metal layer strengthen the metal layer, akin to work hardening.

Figure 3:
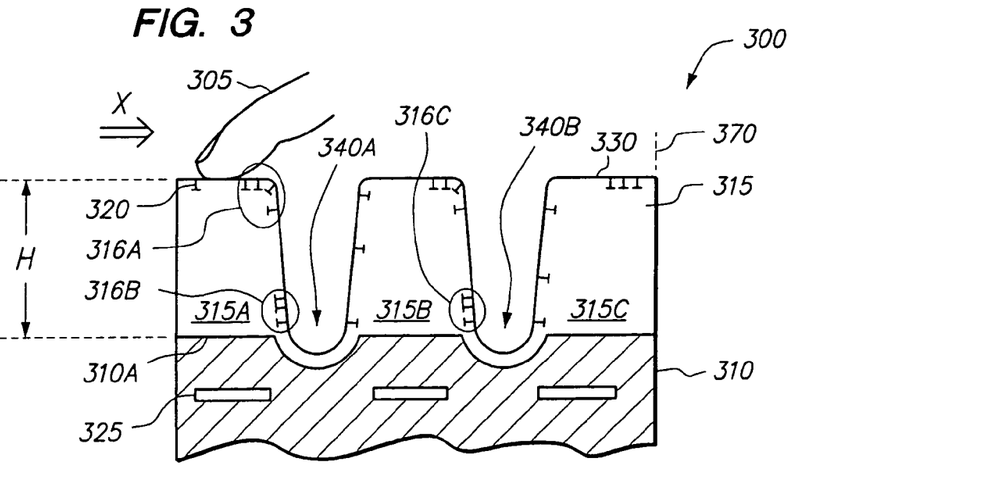
FIG. 3 is a side cross-sectional view of a device with a top metal layer in accordance with the present invention.

FIG. 3 is a side cross-sectional view of a finger swipe sensor 300 having a top metal layer 315 in accordance with one embodiment of the present invention. FIG. 3 shows a finger 305 swiping across a surface of the finger swipe sensor 300 in the direction X. The finger swipe sensor 300 is shown exaggerated, merely to aid in the illustration; generally, the finger swipe sensor 300 is much smaller in relation to the finger 305, than is depicted in FIG. 3.

As shown in FIG. 3, the finger swipe sensor 300 includes a contact sensing layer 310 containing multiple contact sensing elements 325. The contact sensing layer 310 is preferably a semiconductor die containing multiple device layers for capturing, processing, or both capturing and processing images swiped over or adjacent to the metal layer 315. To simplify the discussion that follows, the contact sensing layer 310 is referred to as a single layer. Those skilled in the art will appreciate that the contact sensing layer 310 generally includes multiple layers. Throughout the discussion that follows, any reference to a single layer also refers to multiple layers. Examples of device layers and electronic circuitry used in finger swipe sensors are described in patent application Ser. No. 11/070,154, titled "Electrostatic Discharge Protection for a Fingerprint Sensor," filed Mar. 1, 2005, which is hereby incorporated by reference.

The metal layer 315 contains dislocations 320 and vias 340A and 340B (collectively referred to as vias 340). The metal layer 315 can also overlay the contact sensing elements 325, though it does not have to. While the metal layer 315 is shown to contain only two vias 340, it will be appreciated that the metal layer 315 generally contains many more vias 340. The vias 340 divide the metal layer 315 into a first portion 315A, a second portion 315B, and a third portion 315C. The dislocations 320 are hindered from moving to the rightmost edge (e.g., 370) of the metal layer 315 by the out-of-plane dislocations created by the presence of the vias 340. For example, the dislocations and other defects in the portion 315A are restrained in the portion 315A by the left-most via 340A. Likewise, the dislocations and other defects in the portion 315B are restrained in the portion 315B by the rightmost via 340B, and the dislocations and other defects in the portion 315C are restrained in the portion 315C by other vias (not shown). Thus, fewer dislocations can collect or pile up at the metal edges.

Still referring to FIG. 3, the formation of new dislocations is impeded because the energy required to create new dislocations is higher owing to the dislocation pile ups created around the vias 340, as shown by the pile ups 316A-C. Because dislocation formation and movement are impeded, the metal layer 315 is more resistant to abrasion and erosion effects.

In the embodiment of FIG. 3, the metal layer 315 is patterned to contain the vias 340. As described below, in other embodiments, a passivation layer is patterned with vias and a metal layer is formed over the passivation layer. In these other embodiments, a cross section of the metal layer is substantially U-shaped, a structure that impedes the movement and formation of dislocations and other defects in accordance with the present invention.

As shown in FIG. 3, the metal layer 315 has a thickness H. In one embodiment, H is 2-10 µm. It will be appreciated that H can have other values, selected to fit the application at hand.

In one embodiment, the contact sensing elements 325 are used to capture portions of a swiped fingerprint image. Accordingly, the contact sensing elements 325 are coupled to finger swipe processing electronics (see, e.g., FIG. 8), used to reconstruct a fingerprint image from a finger swiped across the metal layer 315. Alternatively, the contact sensing elements 325 together capture an entire fingerprint image and accordingly are coupled to finger placement processing electronics. In still other embodiments, the contact sensing elements 325 are coupled to any other type of processing electronics, for processing image or other data captured by contacting the metal layer 315 with a finger, stylus, or other object. This other processing electronics includes, but is not limited to, pressure-sensitive buttons and the like.

FIG. 3 shows the metal layer 315 exposed, that is, with no other layers above it. A finger swiping across the top surface of the contact sensor 300 will thus directly contact the metal layer 315.

FIG. 3 illustrates vias 340 defined by sloping walls that curve to a rounded base. As shown in FIGS. 9-12, these vias 340 can also have circular top cross sections. It will be appreciated that vias in accordance with the present invention can have many different shapes including those having rectangular side cross-sections or those with top cross-sections in the shape of squares, rectangles, polygons, or any other shapes.

In the embodiment shown in FIG. 3, the vias 340 do not electrically couple the metal layer 315 to other layers that form the contact sensor 300. The vias 340 thus function only as "strengthening vias." It will be appreciated that in other embodiments, the vias 340 do electrically couple the metal layer 315 to other layers or the vias 340 do couple other layers to one another. In these other embodiments, the vias 340 thus function not only as strengthening vias but also as electrical conduits.

Figure 4A:
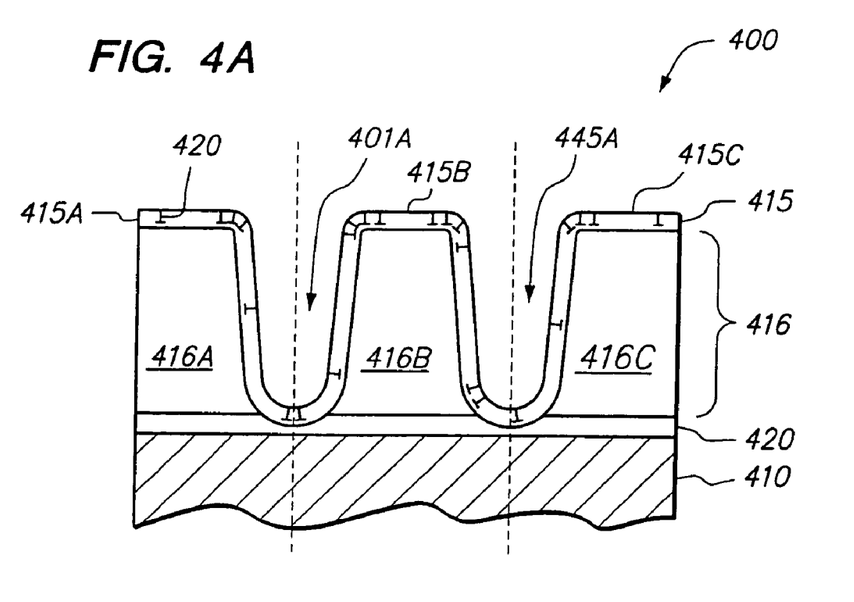
FIG. 4A is a side cross-sectional view of a device with a top metal layer formed over a passivation layer in accordance with the present invention.

FIG. 4A is a side cross-sectional view of a device 400 in accordance with the present invention. The device 400 includes a metal layer 415 having dislocations 420. FIG. 4A shows the device 400 after objects have been swiped across the metal layer 415, and thus shows the dislocations 420 piled up around the bends in the metal layer 415. The metal layer 415 defines a plurality of vias, shown by the exemplary vias 401A and 445A, that extend into a passivation layer 416. The vias 401A and 445A divide the metal layer 415 into a first portion 416A, a second portion 416B, and a third portion 416C, in which dislocations are contained. The passivation layer 416 overlies a metal layer 420, and the metal layer 415 extends down to and electrically couples to the metal layer 420. The metal layer 420 overlies a substrate 410, which contains device electronics (not shown). In one embodiment, the device electronics include contact sensing elements. In one embodiment, the metal layer 420 is connected to a ground. The metal layer 415 thus functions as an ESD layer for attracting an ESD charge and shunting it to a ground before it can harm the device electronics.

Figure 4B:
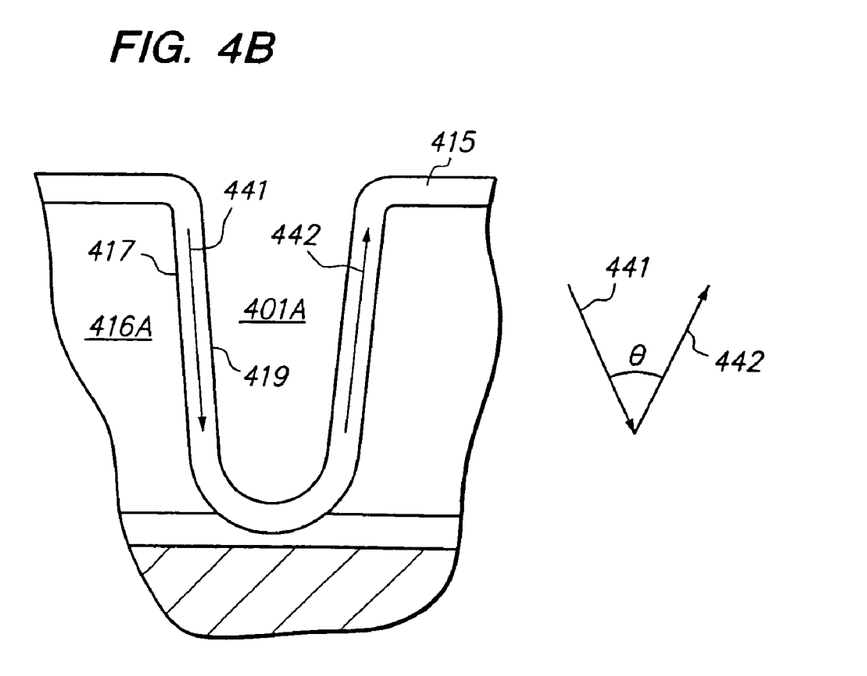
FIG. 4B is an enlarged view of a via from FIG. 4A, showing glide planes.

As shown in FIG. 4A, within the via 401A, the cross-section of the metal layer 415 is substantially U-shaped. FIG. 4B is an enlarged side cross-sectional view of the via 401A. As shown in FIG. 4B, the top surface of the metal layer 419 is substantially contoured to the inner wall 417 of the via 401A. Furthermore, the metal layer 415 along a left side wall of the via 440A has a glide plane shown by the arrow 441 and the metal layer 415 along a right side wall of the via 440A has a glide plane shown by the arrow 442. The angles formed by the two glide planes, shown by the angle θ, is substantially acute. Accordingly, dislocations traveling along the glide plane shown by the arrow 441 are impeded from traveling along the glide plane shown by the arrow 442. Of course, angles formed by the glide planes can be obtuse angles or angles with other values.

Figure 5:
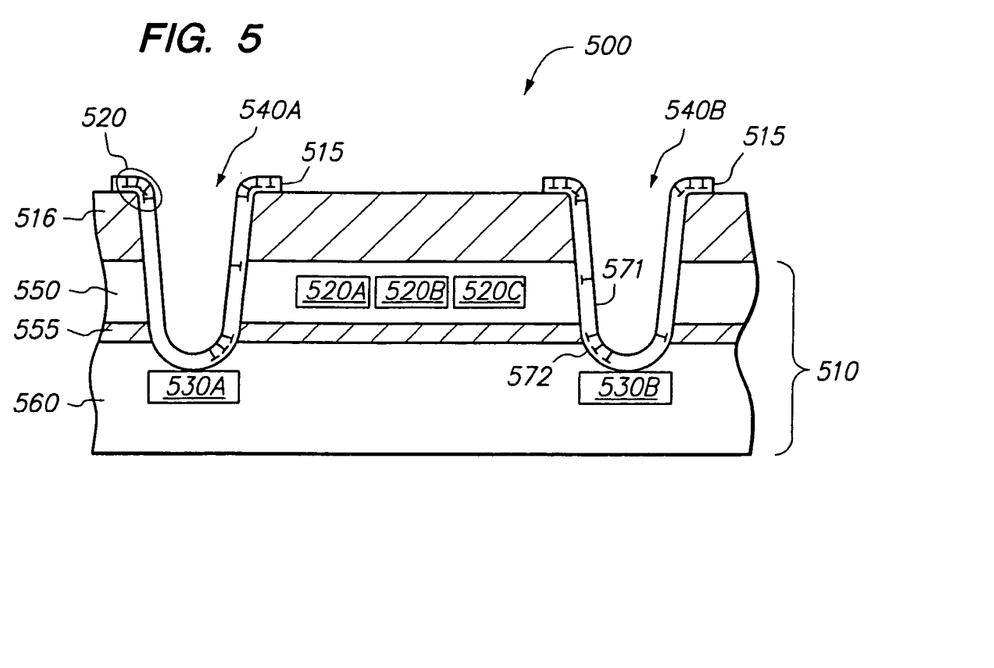
FIG. 5 is a side cross-sectional view of a finger swipe sensor having a top metal layer in accordance with the present invention, coupled to an embedded metal layer.

Metal layers in accordance with the present invention can be coupled to lower metal layers in different ways or not coupled to lower metal layers at all. FIG. 5, for example, is a side cross-sectional view of a device 500 having a metal layer in accordance with the present invention. The device 500 includes an exposed metal layer 515 containing dislocations or other defects 520. The metal layer 515 overlies a passivation layer 516 shown as portions 516A, 516B, and 516C and containing vias 540A and 540B. Both top 571 and bottom 572 surfaces of the metal layer 515 are contoured to the inner walls of the vias 540A and 540B. The metal layer 515 partially overlies a substrate 510. The substrate 510 includes a layer 550 containing contact sensing elements 520A-C, a second layer 555, and a third layer 560 that includes metal traces 530A and 530B. The metal layer 515 does not overlie the contact sensing elements 520A-C. The metal layer 515 is electrically coupled to the metal traces 530A and 530B.

Figure 6:
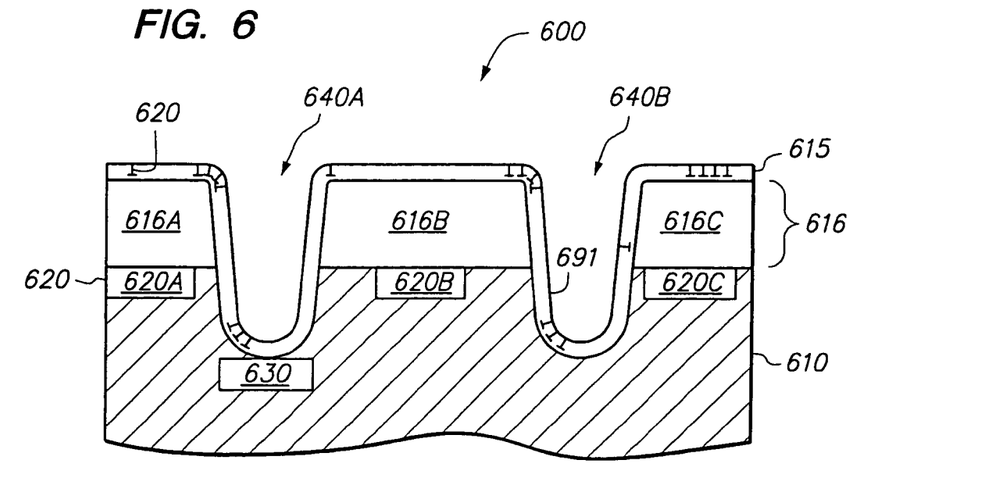
FIG. 6 is a side cross-sectional view of a device with a top metal layer in accordance with the present invention, having multiple vias, only some of which are coupled to an embedded metal layer.

FIG. 6 is a side cross-sectional view of a device 600 having a metal layer in accordance with the present invention. The device 600 includes an exposed metal layer 615 containing dislocations or other defects 620, shown as coalescing or piling up around the bends of the metal layer 615. The metal layer 615 partially or completely overlies a passivation layer 616 shown as portions 616A, 616B, and 616C and containing vias 640A and 640B. A top surface 691 of the metal layer 615 is contoured to the inner walls of the vias 640A and 640B. The metal layer 615 overlies a substrate 610 that includes device elements 620A, 620B, and 620C and a lower metal layer 630. The metal layer 615 is electrically coupled to the metal layer 630 only below the via 640A and not below the via 640B.

Figure 7A:
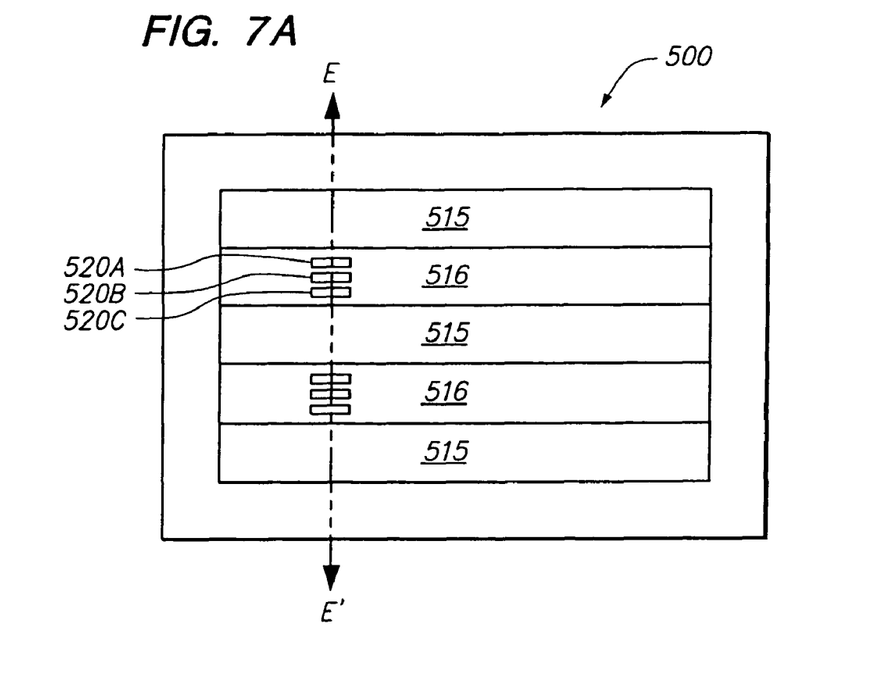
FIGS. 7A-C are top views of metal layers in accordance with several embodiments of the present invention.
Figure 7B:
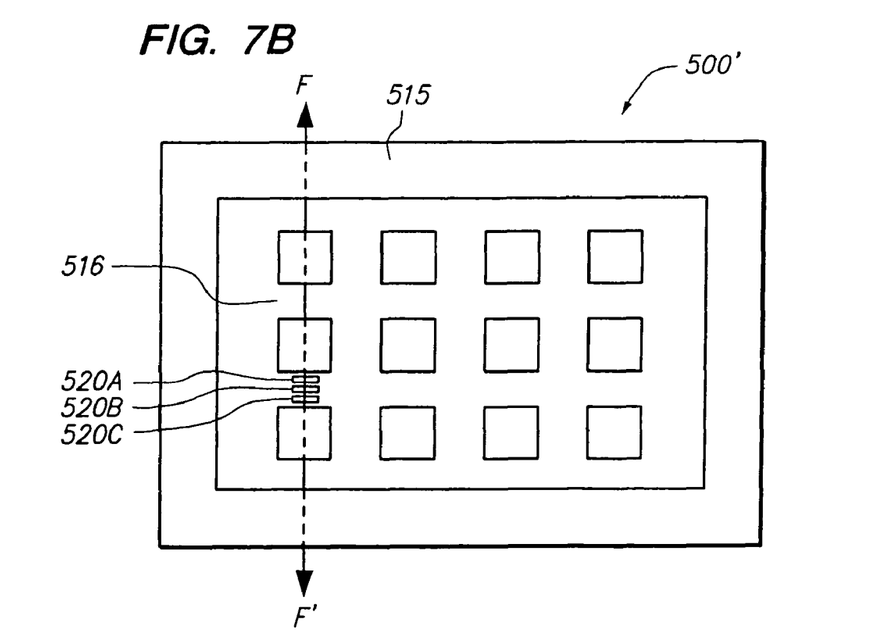
Figure 7C:
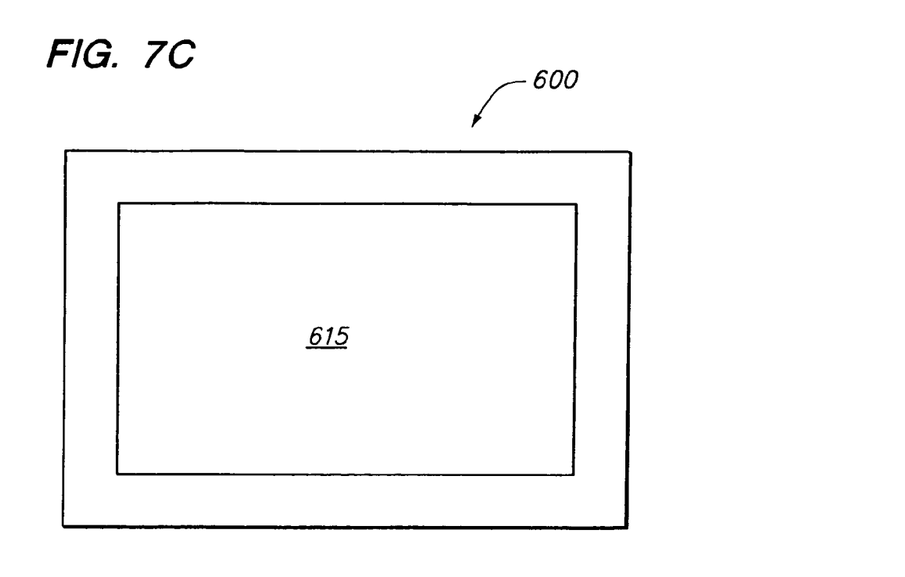

Metal layers in accordance with the present invention can overlie lower layers of a device in many ways, such as shown in FIGS. 7A-C. FIG. 7A is a top view of the device 500 of FIG. 5. FIG. 5 is a cross section of the device 500 taken along the line EE'. FIG. 7A shows that the metal layer 515 only partially overlies the passivation layer 516, in strips. FIG. 7B shows an alternative embodiment for a device 500', in which the metal layer 515 partially overlies the passivation layer 516, in blocks or squares. In one embodiment, FIG. 5 is a cross section of the device 500' taken along the line FF'. FIG. 7C is a top view of the device 600 of FIG. 6. FIG. 7C shows that the metal layer 615 completely and continuously overlies the passivation layer 616. Those skilled in the art will recognize other ways in which the metal layer overlies a passivation layer in accordance with the present invention.

Figure 8:
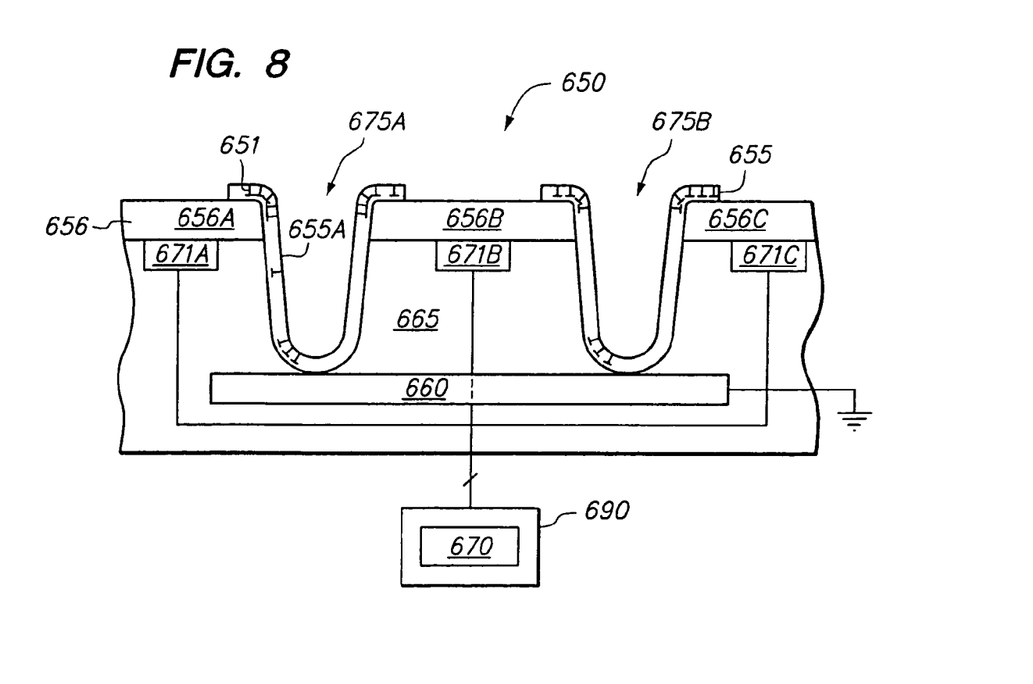
FIG. 8 is a side cross-sectional view of a finger swipe sensor having a top metal layer in accordance with the present invention and having contact sensing elements that are coupled to sensing circuitry on a host module.

As explained above, devices in accordance with the present invention include device electronics coupled to processing electronics. In one embodiment, the device electronics include finger swipe sensing elements coupled to electronics used to process the images and other data captured by finger swipe sensing electronics. FIG. 8, for example, is a side cross-sectional view of a device 650 having a metal layer 655 in accordance with the present invention. The metal layer 655 contains dislocations or other defects 651. The metal layer 655 overlies a passivation layer 656 shown divided into portions 656A, 656B, and 656C and containing vias 675A and 675B. A top surface 655A of the metal layer 655 is contoured to the inner walls of the vias 675A and 675B. The metal layer 655 extends down into the vias 675A and 675B to electrically couple to a metal layer 660 that may, for instance, be connected to a ground. The metal layer 660 overlies a substrate 665 that includes device elements 671A-CD coupled to processing circuitry 670 on a host module 690. In one embodiment, the host module 690 is integrated with the device 650.

Preferably, the device elements 671A-C are contact sensing elements and the processing circuitry 670 is finger swipe processing electronics. Alternatively, the processing circuitry 670 is finger placement processing electronics, pressure-sensitive contact electronics, or any other type of electronics for processing image or data placed on or above a top surface of the device 650. In one embodiment, the contact sensing elements 671A-C are pressure sensitive pads overlying variable resistors and used as cursor or other pointing devices.

Figure 9:
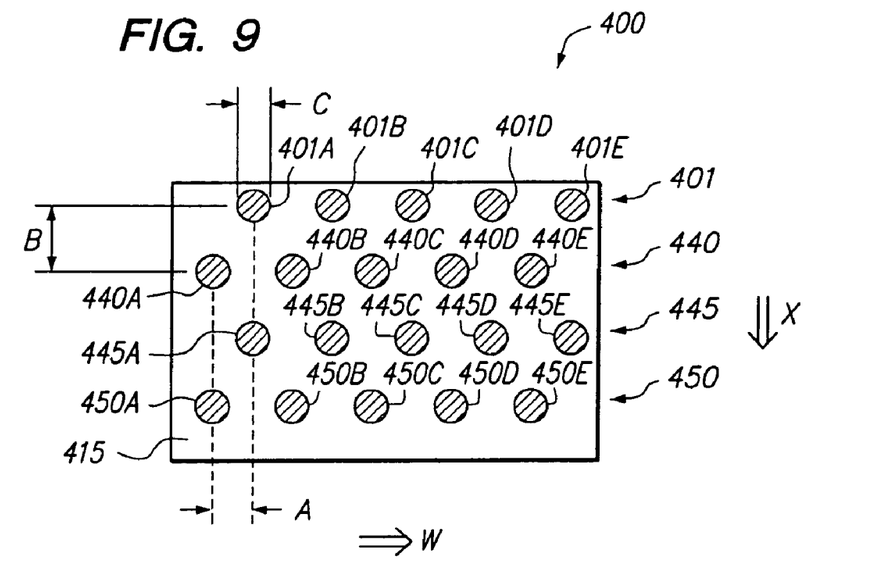
FIG. 9 is a top cross-sectional view of a device with a top metal layer containing vias, in accordance with one embodiment of the present invention.

Preferably, vias in metal layers are configured in an array of rows and columns. FIG. 9 is a top cross-sectional view of the finger swipe sensor 400 of FIG. 4. FIG. 9 shows the metal layer 415 of the finger swipe sensor 400 having vias 401A-D, 440A-D, 445A-D, and 450A-D, collectively referred to as vias 470. The vias 470 are all shown cross-hatched to indicate that they are depressions in the metal layer 415. Typically, the vias 470 are configured in an M×N array of rows and columns, where M and N are any integers. In one embodiment, the vias 470 form a 46×4 array. In the embodiment shown in FIG. 9, the vias 470 form a 5×4 array. In the X direction, the vias 470 are uniformly spaced apart by B units, and in the W direction, the vias 470 are uniformly spaced apart by the distance A units. As shown by the exemplary via 401A, the vias 470 have a top cross-sectional diameter C. The values of A, B, and C can be selected to fit the application at hand. In one embodiment, the values of A, B, and C are approximately 200 μm; 217 μm and 180 μm; and 36 μm, respectively. In another embodiment, the values of A, B, and C are approximately 400 μm, 200 μm, and 36 μm respectively. In one embodiment, the vias 470 have an aspect ratio of approximately 2:1; in other embodiments, the aspect ratio is larger, such as 10:1 or larger.

As shown in FIG. 9, the vias 401A-D form a first row of vias 401, the vias 440A-E form a second row of vias 440, the vias 445A-D form a third row of vias 445, and the vias 450A-D form a fourth row of vias 450. The vias in adjacent rows are offset from one another. For example, in the X direction, in the adjacent rows 401 and 440, the via 401A is interspersed between the vias 440A and 440B.

Figure 10:
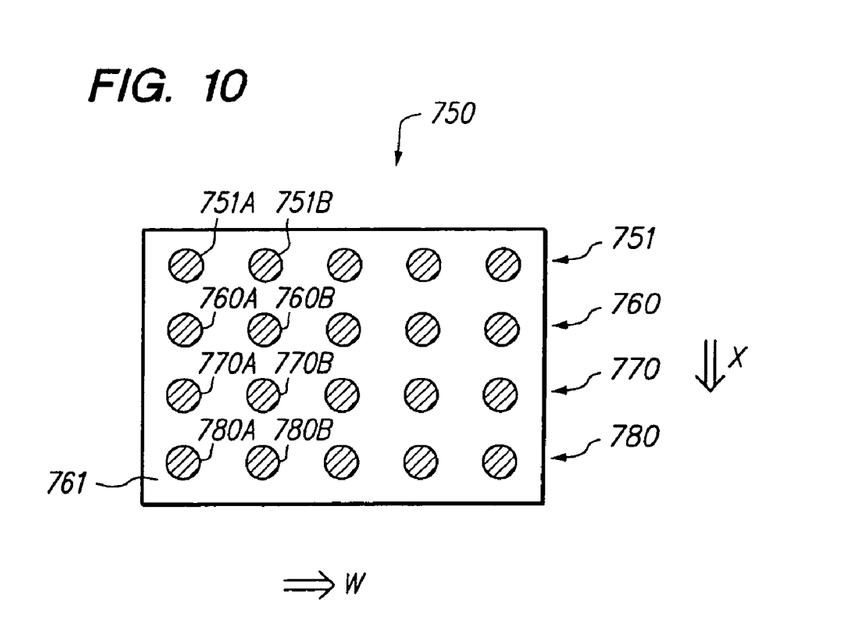
FIG. 10 is a top cross-sectional view of a device with a top metal layer containing vias, in accordance with another embodiment of the present invention.

FIG. 10 is a top view of a device 750 having rows of vias aligned with one another. The device 750 includes a metal layer 761 containing vias in accordance with the present invention. The metal layer 761 contains a first row of vias 751, including vias 751A and 751B; a second row of vias, including vias 760A and 760B; a third row of vias 770, including vias 770A and 770B; and a fourth row of vias 780, including vias 780A and 780B. Vias in the row 751 are aligned with vias in the adjacent row 760. For example, the via 751A and the via 760A are essentially aligned with one another along the X direction.

Figure 11:
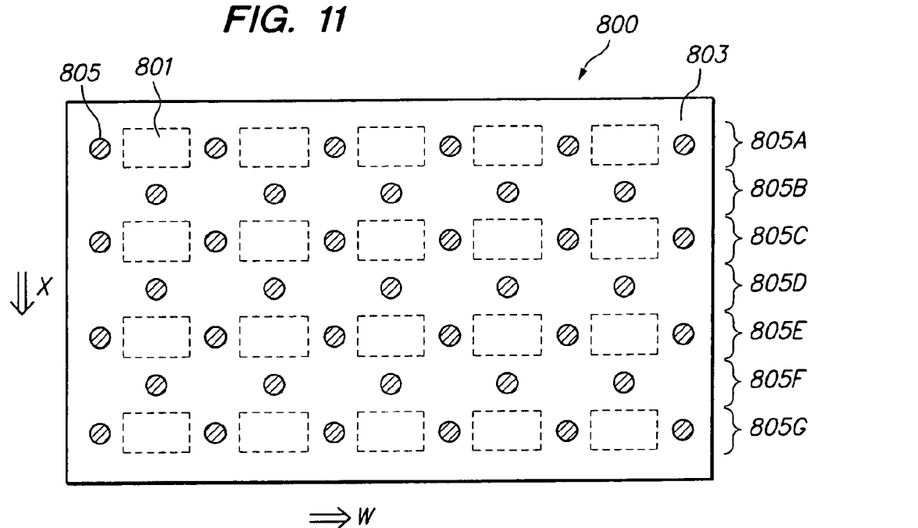
FIGS. 11 and 12 are top cross-sectional views of finger swipe sensors with top metal layers in accordance with the present invention, showing vias and, in phantom, contact sensing elements.

A top metal layer of a contact sensor may or may not overlay the contact sensing elements. If the overlay exists, the metal layers, in accordance with the present invention, can be configured to overlie contact sensing elements in many ways. In FIGS. 11-14, for example, metal layers contain patterned features and overlie contact sensing layers. Each contact sensing layer contains contact sensing elements, which are shown in phantom as dotted lines. FIG. 11 is a top view of a contact sensor 800 having a metal layer 803 containing vias 805. The vias 805 overlie areas between the contact sensing elements 801 but do not overlie the contact sensing elements 801 themselves. In other words, the vias 805 are offset from the contact sensing elements 801.

The vias 805 are patterned into rows 805A-G in the direction X. The vias 805 in the rows 805A, 805C, 805E, and 805G are offset from the vias 805 in the rows 805B, 805D, 805F, and 805G. In other words, the vias 805 in adjacent rows ("opposing patterned features") are offset, and the vias 805 in alternating rows are aligned. The rows 805A and 805C can be said to delineate a first segment of the contact sensor 800, the rows 805B and 805D delineate a second segment of the contact sensor 800, etc. In accordance with the invention, movement and creation of dislocations in any segment are hindered by the presence of vias.

In those embodiments in which the contact sensor 800 is a finger swipe sensor, the direction X is the swipe direction, and the finger sensor is wider in the direction W than it is long in the direction X.

Figure 12:
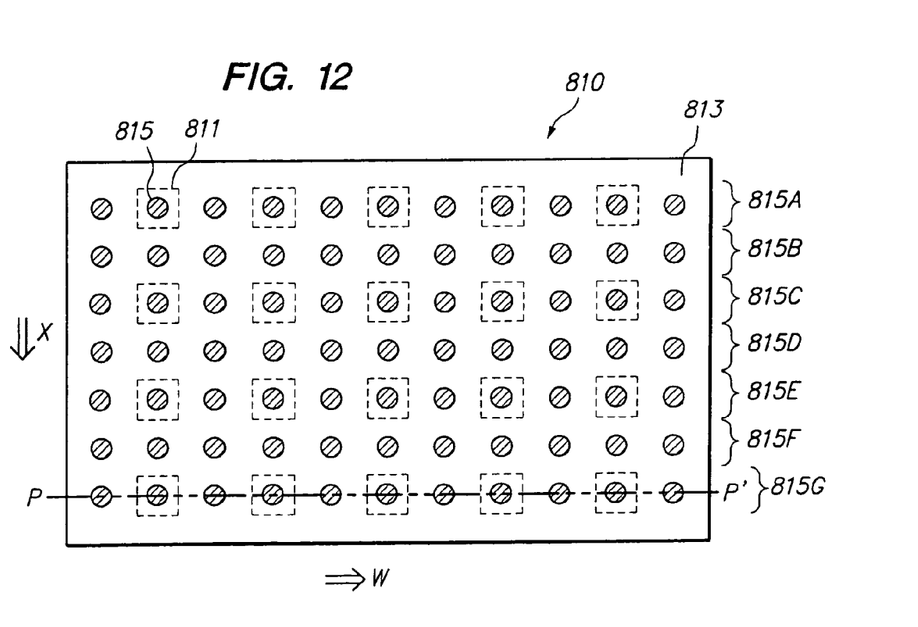

FIG. 12 is a top view of a contact sensor 810 having a metal layer 813 containing vias 815. Some of the vias 815 overlie contact sensing elements 811. The vias 815 are patterned into rows 815A-G in the direction X. The vias 805 in the rows 815A-G are aligned with one another.

Figure 13:
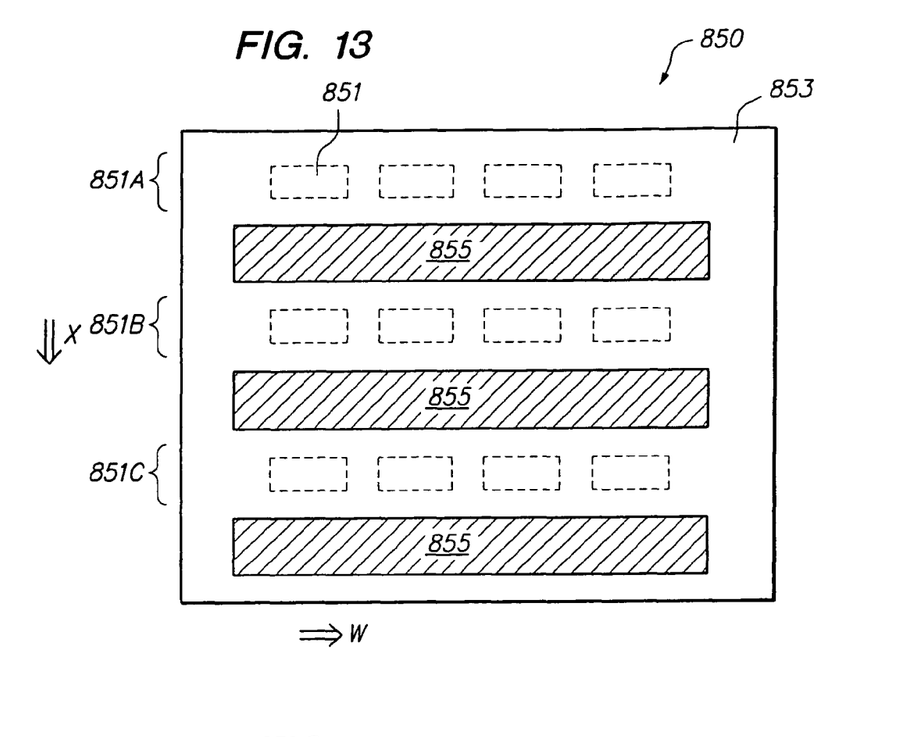
FIGS. 13 and 14 are top cross-sectional views of finger swipe sensors with top metal layers in accordance with the present invention, showing troughs and, in phantom, contact sensing elements.
Figure 14:
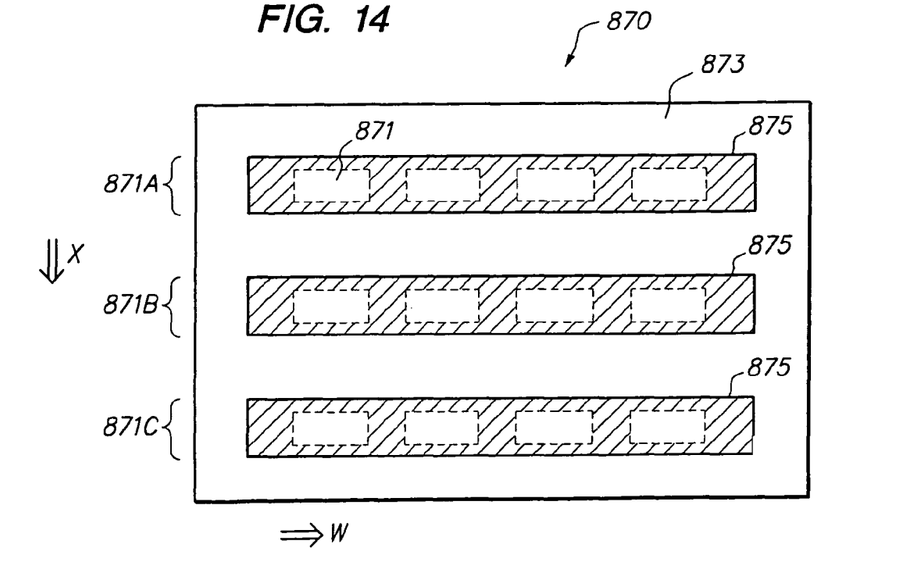

FIG. 13 is a top view of a contact sensor 850 having a metal layer 853 containing patterned features 855. The patterned features 855 overlie areas between rows (e.g., 851A, 851B, and 851C) of contact sensing elements 851. The patterned features 855 are trough-shaped and are shown as hatched to indicate that they are depressions. Finally, FIG. 14 is a top view of a contact sensor 870 having a metal layer 873 containing patterned features 875. The patterned features 875, also trough-shaped, overlie rows (e.g., 871A, 871B, and 871C) of contact sensing elements 871. Again, the patterned features 855 are shown hatched to indicate that they are depressions in the metal layer 873.

Figure 15:
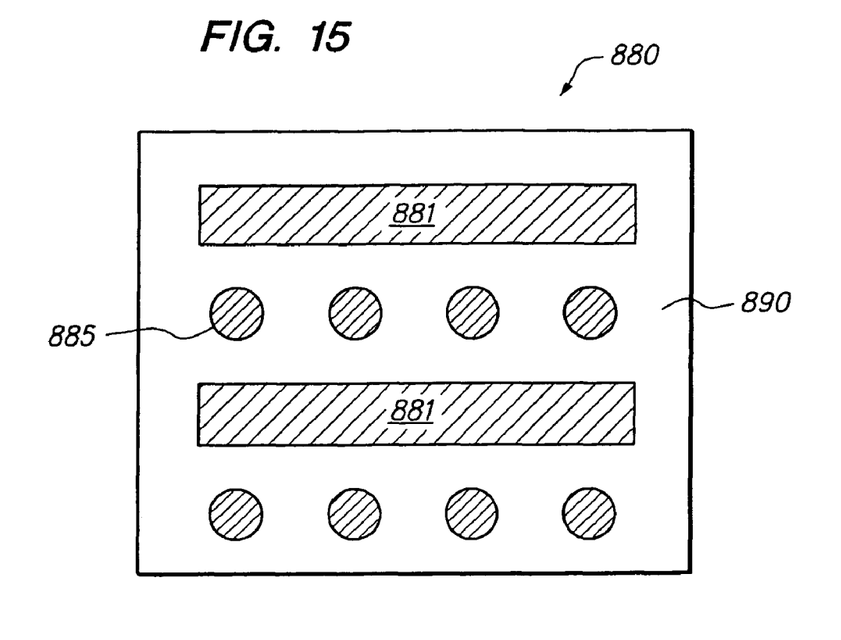
FIG. 15 is a top cross-sectional view of a device with a top metal layer that has both vias and troughs in accordance with the present invention.

FIG. 15 is a top cross-sectional view of a device 880 having a top metal layer 890 in accordance with the present invention. The top metal layer 890 includes a combination of troughs 881 and vias 885.

While the examples described above show metal layers with vias in a 5×4 array (FIG. 9) and an 11×7 array (FIG. 12), metal layers in accordance with the present can have any number of vias having any number of sizes. In one embodiment, the number, sizes, or both must be sufficient to limit the movement and formation of dislocations so as to sufficiently prevent the abrasion and erosion of the top metal layer. Using the metal layer 813 in FIG. 12 as an example, the line P-P' intersects the metal layer 813 along the row of vias 815G. In this example, the combined width of all the vias 815 along the line P-P' accounts for more than 50% of the total width of the metal layer 813 along the line P-P', a proportion sufficient to limit the movement and formation of dislocations in accordance with the present invention. This example is illustrative only. In most applications, the size of the sensing elements and the need to connect the sensing elements to other circuitry will limit the via density to much less than the 50% used in this example. It will be appreciated, of course, the proportion of the combined width of vias to the entire width of a metal layer along a line can have values other than 50% in accordance with the present invention. In the finger swipe sensor 400 of FIG. 9, for example, the proportion is approximately 5% in the X direction and 10% in the W direction.

Figure 16:
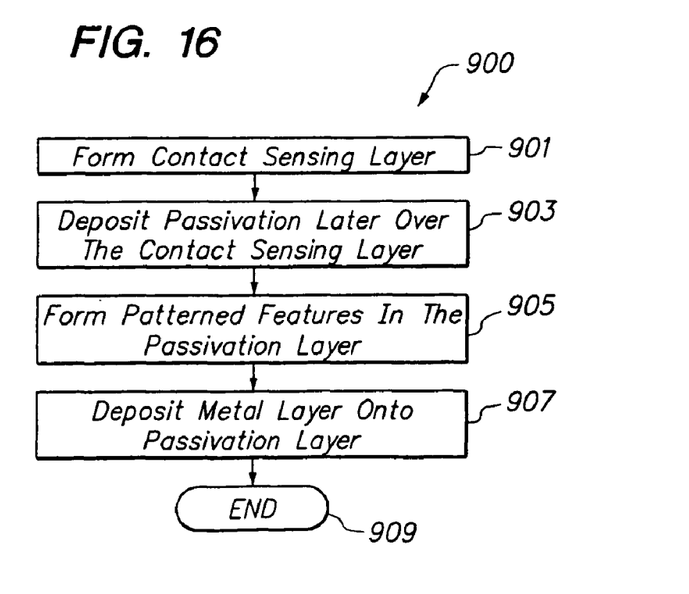
FIG. 16 is a flow chart showing steps for fabricating a device having a top metal layer in accordance with the present invention.

FIG. 16 shows steps 900 for fabricating a finger swipe sensor having a metal layer in accordance with the present invention. First, in the step 901, a contact sensing layer containing contact sensing elements is formed on a substrate. The contact sensing layer can include multiple device layers and preferably has a top metal layer. In the step 903, a passivation layer is formed over the contact sensing layer. In the step 905, patterned features are formed into the passivation layer. In one embodiment, the patterned features are formed onto the passivation layer down to a metal layer embedded in the contact sensing layer. In the step 907, a metal layer is formed so that it extends into patterned features and has a top surface that contours to the walls of the patterned features. In one embodiment, the metal layer electrically couples to one or more metal layers in the contact sensing layer. In the step 909, the process ends.

Embodiments of the present invention use patterned features in metal layers that overlie top surfaces of a contact sensing layer. The patterned features create "speed bumps," which impede dislocation creation and movement within the metal layer, thus reducing abrasion and erosion effects. Patterned features include vias and troughs, and are especially useful on devices such as contact sensors, which are subjected to constant placement and swiping of objects, such as fingers or styluses. Contact sensors include, but are not limited to, finger swipe sensors, finger placement sensors, analog pushbutton devices, or any other devices that function by placing or swiping an object across its surface.

Contact sensors in accordance with the present invention are used on personal computers, personal digital assistants, cell phones, and cameras, to name only a few devices. Contact sensing elements in accordance with the present invention include, but are not limited to, capacitive sensing elements, optical sensing elements, electromagnetic sensing elements, and thermal sensing elements.

It will be readily apparent to one skilled in the art that other modifications may be made to the embodiments without departing from the spirit and scope of the invention as defined by the appended claims.

What is claimed is:

1. A device comprising:
a device layer containing contact sensing elements and having a plurality of device layer depressions that extend into the device layer; and
a top metal layer overlying the device layer and extending into the depressions, the top metal layer also having a plurality of top metal layer depressions corresponding to the plurality of device layer depressions.

2. The device of claim 1, wherein a surface of the metal layer opposed to the device layer is contoured to the plurality of device layer depressions.

3. The device of claim 1, wherein the device layer further comprises a second metal layer electrically coupled to the first metal layer.

4. The device of claim 3, wherein the second metal layer is coupled to a ground.

5. The device of claim 1, wherein the plurality of device layer depressions comprise vies.

6. The device of claim 5, wherein the vias are arranged in a plurality of rows.

7. The device of claim 6, wherein vias in adjacent rows are offset from one another.

8. The device of claim 6, wherein vies in adjacent rows are aligned with one another.

9. The device of claim 1, wherein the plurality of device layer depressions comprise troughs.

10. The device of claim 9, wherein the troughs have elongated widths that extend in a direction perpendicular to a swipe direction of the device.

11. The device of claim 1, wherein the top most device layer that defines the device layer depressions is a passivation layer.

12. The device of claim 11, wherein the first metal layer is directly coupled to the passivation layer.

13. The device of claim 1, wherein the contact sensing elements comprise finger swipe sensing elements.

14. The device of claim 1, wherein the contact sensing elements comprise finger placement sensing elements.

15. The device of claim 1, wherein the contact sensing elements comprise analog pressure sensing elements.

16. The device of claim 1, wherein a surface of the first metal layer is exposed.

17. A contact sensor comprising:
a device layer containing contact sensing elements; and
a metal layer desposited above the device layer and patterned in acute planes that extend to and from the device layer.

18. The contact sensor of claim 17, wherein the contact sensing elements are capacitive sensing elements.

19. The contact sensor of claim 17, wherein the contact sensing elements are anyone of optical sensing elements, electromagnetic sensing elements, and thermal sensing elements.

20. The contact sensor of claim 17, wherein the device layer comprises integrated circuitry fabricated on a semiconductor substrate.

21. The contact sensor of claim 17, wherein the device layer comprises a plurality of vias and the metal layer extends into the plurality of vias.

22. The contact sensor of claim 21, wherein each of the plurality of vias has an aspect ratio of at least 10:1.

23. The contact sensor of claim 17, wherein the metal layer does not overlie the contact sensing elements.

24. The contact sensor of claim 17, wherein the metal layer overlies the contact sensing elements.

25. A device comprising:
a contact sensing layer comprising multiple contact sensing elements and multiple patterned features that extend into the contact sensing layer; and
an exposed metal layer that extends into the multiple patterned features and having an exposed surface contoured to walls of the multiple patterned features, wherein the multiple patterned features divide the metal layer into multiple segments in a swipe direction of the device.

26. The device of claim 25, wherein the multiple patterned features comprise rows of vias.

27. The device of claim 26, wherein vias in adjacent rows are aligned with one another.

28. The device of claim 26, wherein vias in adjacent rows are offset from one another.

29. The device of claim 25, wherein the multiple patterned features comprise troughs.

30. The device of claim 25, further comprising a host module coupled to the device layer, wherein the host module is selected from the group consisting of a personal digital assistant, a cell phone, and a digital camera.

31. A method of fabricating a contact sensor comprising:
forming a contact sensing layer having a surface, one or more contact sensing elements, and patterned features that extend into the contact sensing layer; and
forming a metal layer over the contact sensing layer, wherein the metal layer extends into the patterned features and has an exposed surface contoured to the patterned features.

32. The method of claim 31, wherein forming the contact sensing layer comprises forming a passivation layer over the one or more contact sensing elements, wherein the passivation layer is patterned with the patterned features.

33. The method of claim 31, further comprising coupling the one or more contact sensing elements to finger swipe processing electronics.

34. The method of claim 31, further comprising coupling the one or more contact sensing elements to finger placement processing electronics.

35. The method of claim 31, further comprising coupling the one or more contact sensing elements to pressure sensitive processing electronics.

36. The method of claim 31, wherein the patterned features comprise a plurality of vias.

37. The method of claim 36, wherein the plurality of vias form an ordered array.

38. The method of claim 36, wherein the patterned features comprise a plurality of troughs.

39. The method of claim 38, wherein each of the plurality of troughs has an elongated width that extends in a direction perpendicular to a swipe direction of the contact sensor.

* * * * *

UNITED STATES PATENT AND TRADEMARK OFFICE
CERTIFICATE OF CORRECTION

PATENT NO. : 7,940,249 B2  Page 1 of 1
APPLICATION NO. : 11/591242
DATED : May 10, 2011
INVENTOR(S) : Perreault It is certified that error appears in the above-identified patent and that said Letters Patent is hereby corrected as shown below:

Drawing Sheet 9, Fig. 16

Delete:

" "

Insert:

-- --

Column 7, Line 32

Delete: "cursor"
Insert: --cursors--

Column 10, Line 7

Delete: "vies"
Insert: --vias--

Signed and Sealed this
Nineteenth Day of July, 2011

David J. Kappos
*Director of the United States Patent and Trademark Office*